Feb. 20, 1968 R. KENEDI 3,370,272

RELAY DIODE PREFERENCE LOCK-OUT CIRCUIT

Filed Oct. 29, 1963 5 Sheets-Sheet 1

Feb. 20, 1968 R. KENEDI 3,370,272

RELAY DIODE PREFERENCE LOCK-OUT CIRCUIT

Filed Oct. 29, 1963 5 Sheets-Sheet 2

Feb. 20, 1968 R. KENEDI 3,370,272

RELAY DIODE PREFERENCE LOCK-OUT CIRCUIT

Filed Oct. 29, 1963 5 Sheets-Sheet 4

Feb. 20, 1968 R. KENEDI 3,370,272

RELAY DIODE PREFERENCE LOCK-OUT CIRCUIT

Filed Oct. 29, 1963 5 Sheets-Sheet 5

United States Patent Office 3,370,272
Patented Feb. 20, 1968

3,370,272
RELAY DIODE PREFERENCE LOCK-OUT CIRCUIT

Robert Kenedi, Ottawa, Ontario, Canada, assignor to Northern Electric Company, Limited, Montreal, Quebec, Canada Filed Oct. 29, 1963, Ser. No. 319,886
6 Claims. (Cl. 340—147)

This invention relates ot signal preference lockout circuits and particularly concerns a lockout circuit which is inexpensive and overcomes many of the drawbacks of the prior art.

A description of the prior art and then of the invention will not be made with reference to the accompanying drawings in which.

Figure 1:
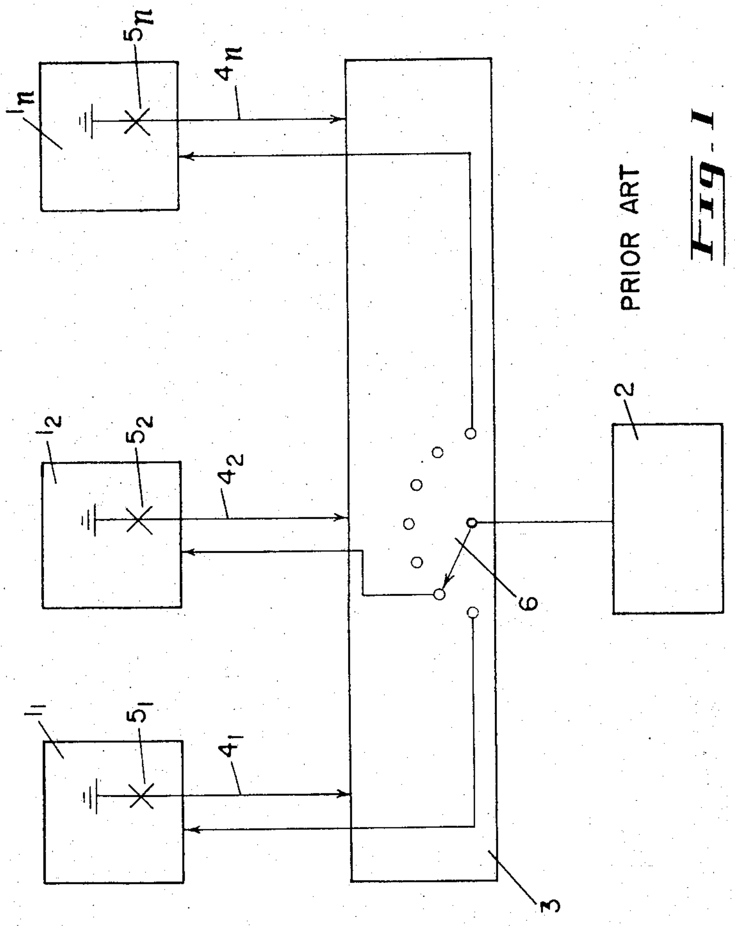
FIGURE 1 shows a block diagram of a preference lockout circuit in conjunction with originating terminal circuits and a common terminal which it serves.

Having reference now to FIGURE 1 a lockout circuit may be provided when a number of terminals $1_1$, $1_2$, $1_N$ may require connection to a common terminal 2. Such a situation would arise if there were a trunk connected from terminal 2, say, to a further common terminal in a different exchange. The simplest form of lockout circuit 3 is one which offers a preference series to the terminals 1. When a terminal 1 requires a connection to the common terminal 2, ground is applied over the respective lead 4 by the closing of contacts 5 on the terminal concerned. If no other terminal has already requested connection to common 2, then the lockout circuit by means exemplified as a rotary switch 6, joins the terminal requesting service to the common terminal 2.

Figure 2:
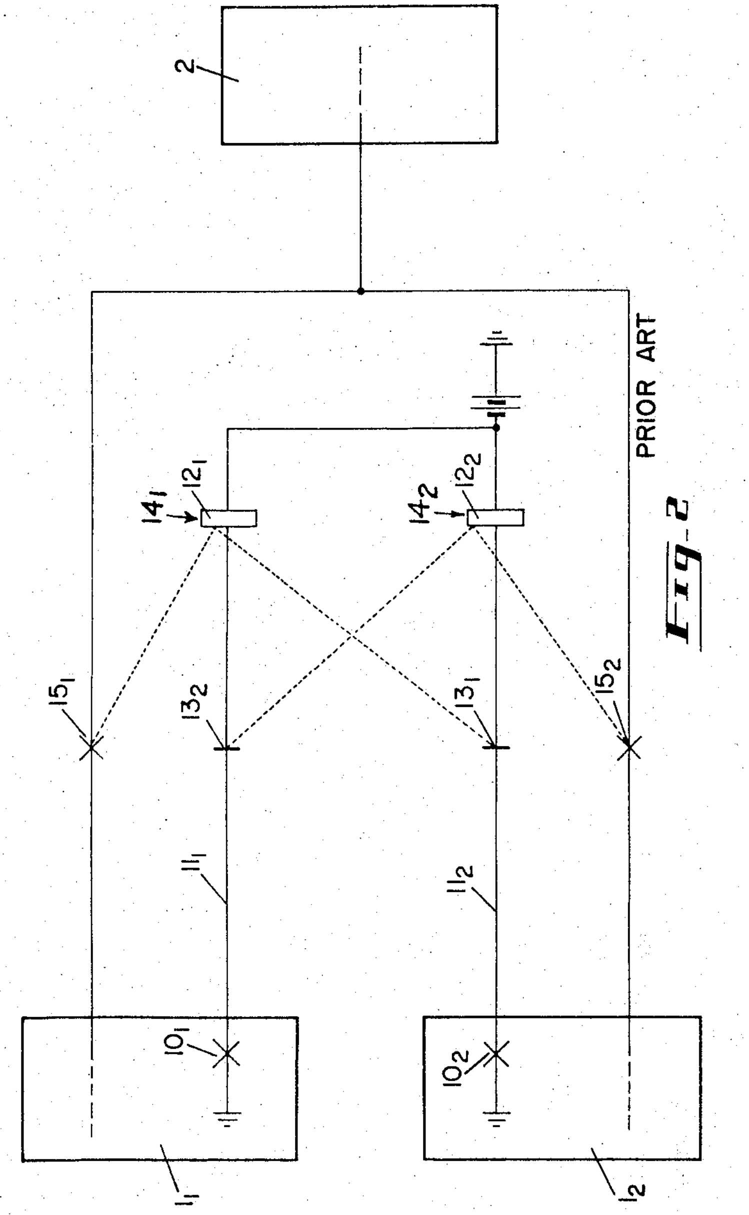
PRIOR ART Fig-2
FIGURE 2 shows a simple lockout circuit known in the art.

In FIGURE 2 is shown a practical form of a simple circuit for achieving the preference lockout function. Neglecting the subscripts for the moment, when a terminal 1 requires connection, its normally open contacts then are closed, thereby sending ground over the wire 11 to actuate its relay winding 12. A pair of normally closed contacts 13 is placed in lead 11. When preference is granted, the normally open contacts 15 are closed, thereby connecting the terminal concerned with common terminal 2.

Still with reference to FIGURE 2 let us now assume that terminal $1_1$ requests connection. Contacts $10_1$ are closed, relay winding $12_1$ is energized thereby closing contacts $15_1$ and connecting terminal $1_1$ with the terminal 2. At the same time the contacts $13_1$ in the lockout circuit associated with terminal $1_2$ are opened, thereby preventing any demand by terminal $1_2$ being satisfied. If the situation is reversed and terminal $1_2$ is the first to request connection, then terminal $1_1$ will be locked out by the opening of contacts $13_2$ when winding $12_2$ is energized. This circuit is satisfactory except when terminal $1_1$ and $1_2$ both require connection simultaneously. The preference then is determined by the speed of the operation of the two relays. In cases of practically identical speed, chatter develops and neither terminal 1 is connected to terminal 2.

It has been found that this difficulty can be overcome if the relays associated with terminals $1_1$ and $1_2$ are given a preference for operation at the moment when both relays are energized. One embodiment of the invention providing such a solution is shown in FIGURE 3.

More particularly in accordance with the invention there is provided in a circuit in which a first and second terminal may be connected to a common terminal for communication therewith, each of said first-mentioned terminals when requesting connection providing an identifying potential, said potential causing relay operation to establish communication between one requesting terminal and the common terminal and simultaneously interrupting the identifying potential lead of the second requesting terminal, the improvement which comprises, establishing priority of operation for the first and second terminals by shunting the reference potential from the terminal of higher priority to that of lower priority.

Figure 3:
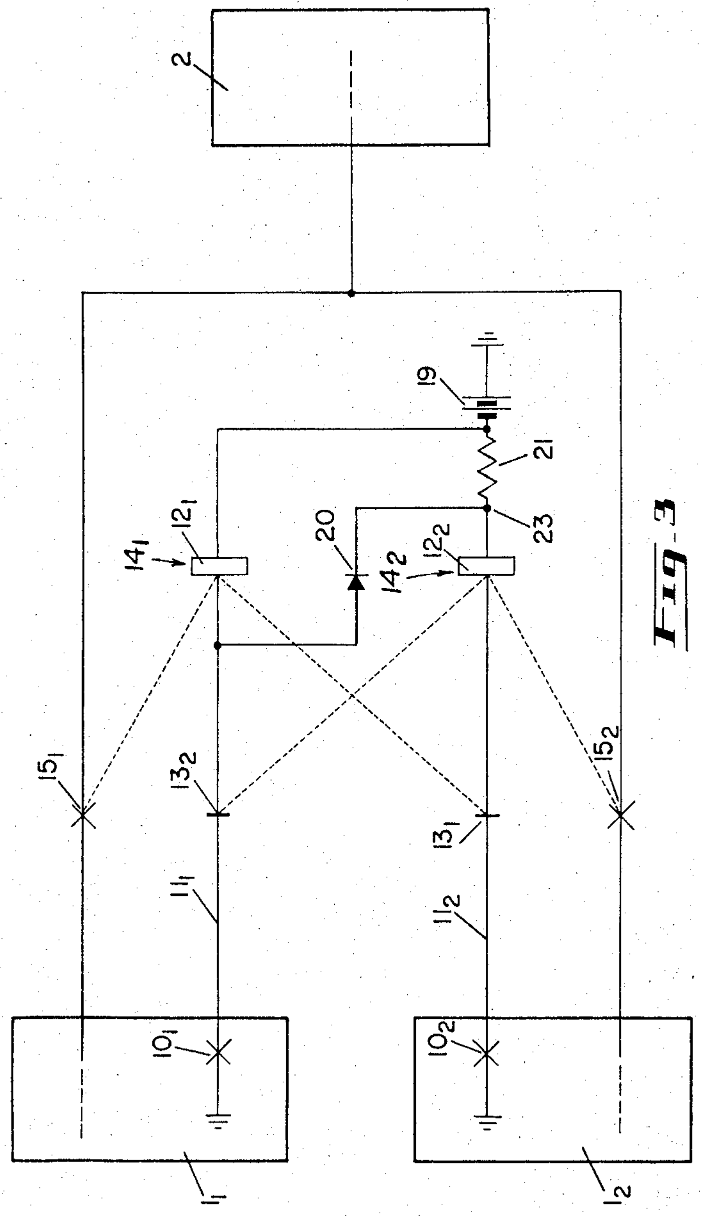
FIGURES 3, 4 and 5 show block diagrams partly schematically of modifications to the prior art in accordance with the teaching of the invention.

In the circuit of FIGURE 3 it is seen that a diode 20 is connected from line $11_1$ (between contacts $13_2$ and winding $12_1$) to line $11_2$ at point 23 (between winding $12_2$ and a resistor 21 connected between winding $12_2$ and battery 19).

Figure 4:
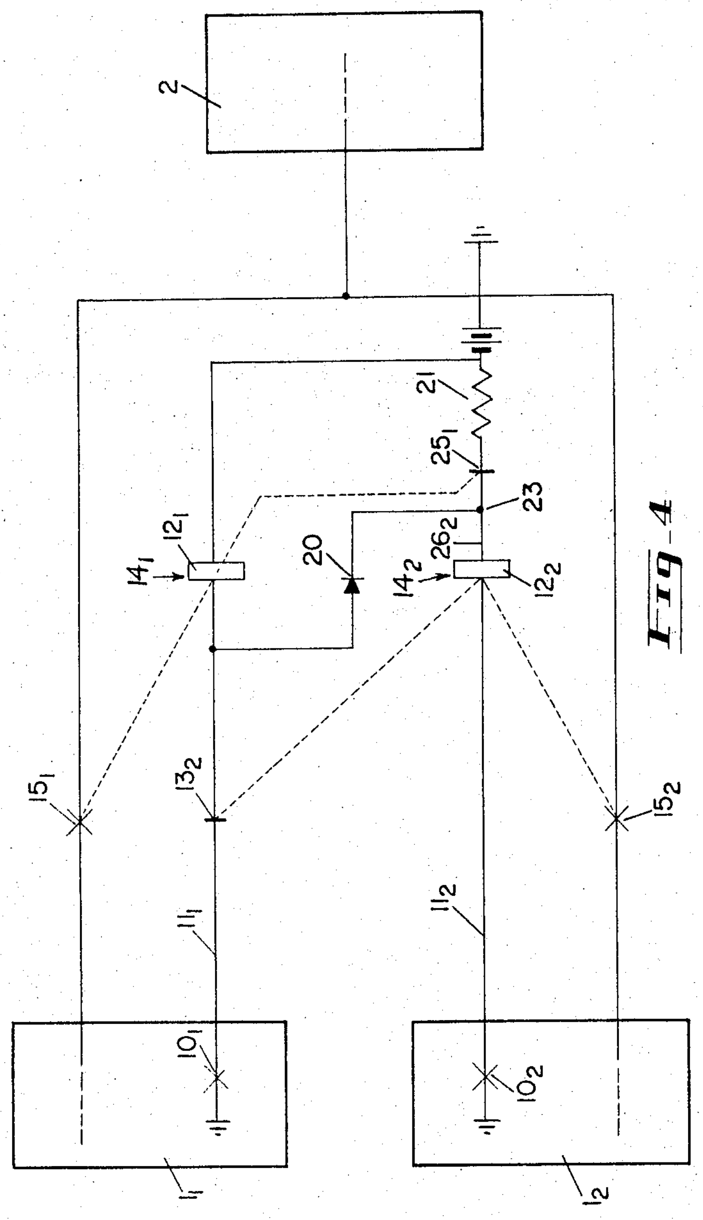

Consider now the operation when terminals $1_1$ and $1_2$ simultaneously request connection as before. Ground is applied to both lines $11_1$ and $11_2$ causing relay $14_1$ to become energized and attempting to energize winding $12_2$. However, due to the presence of diode 20, junction 23 is brought close to ground potential. The actual potential will depend upon the series resistance of diode 20 and the value of resistor 21. In any event, the potential established at 23 is such as to be insufficient to allow the operation of the armature of relay $14_2$. The net result is that terminal $1_1$ becomes connected to the terminal 2 whereas terminal $1_2$ does not. The value of resistor 21 is chosen so that it allows sufficient current for relay winding $12_2$ to operate properly when terminal $1_2$ requests service alone. The resistor 21, however, also must be high enough with respect to the series resistance of diode 20 that junction 23 is brought to such a potential when ground is on line $11_1$, that applying ground to line $11_2$ is insufficient to operate the armature of relay $14_2$. Success depends upon the fact that the time of operation of the relay $14_2$ is much less than that for bringing junction 23 to the low inoperative potential. It should be observed that in the circuit of FIGURE 3 the diode 20 must pass a fairly heavy current during the time that line $11_1$ is grounded and therefore the modification shown in FIGURE 4 is preferred.

In this embodiment normally closed contacts $25_1$ operated by the relay $14_1$ are inserted between junction 23 and resistor 21 and the contacts $13_1$ are omitted. Now when ground potential is applied to line $11_1$ diode 20 carries the full current necessary to drop the potential of junction 23 for the instant before the relay $14_1$ is energized. Upon its energization the contacts $25_1$ are opened and the diode no longer conducts. The advantage of this is that diode 20 carries the peak load current for only a short interval and a relatively small device with a low forward resistance can be chosen without the problems of excessive heating which would otherwise occur.

When terminal $1_2$ is operated, and line $11_2$ is grounded no appreciable current will flow through diode 20 because of the relatively high reverse resistance.

Figure 5:
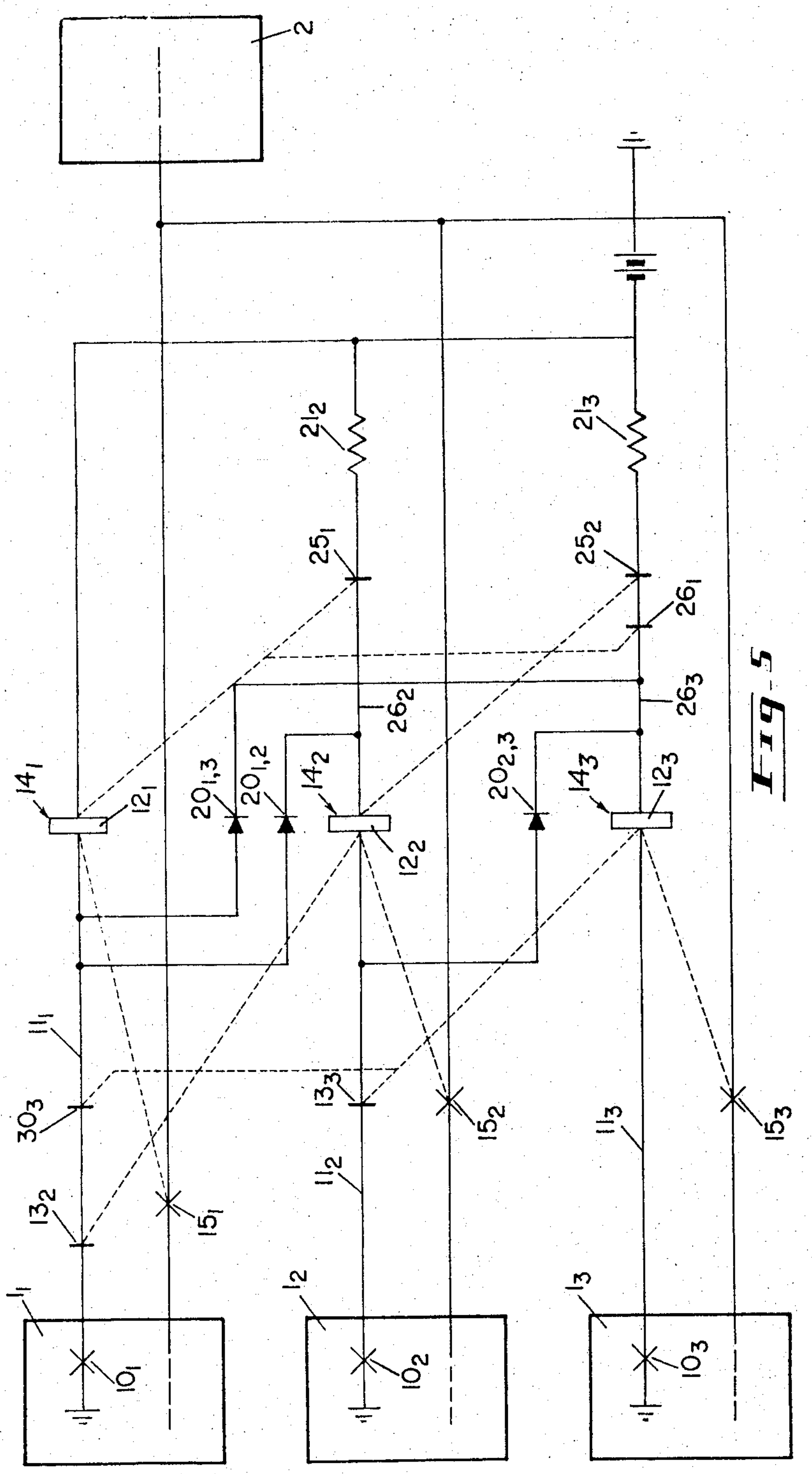

In FIGURE 5 there is shown a network with three originating terminals $1_1$, $1_2$, and $1_3$, and the preference is in that order for simultaneous requests by two or more terminals. The requirements for the diodes 20 and resistors 21 are the same as discussed before. This circuit differs from that of FIGURE 4 in that a diode $20_{1,3}$ has been added between line $11_1$ and line $26_3$. A diode $20_{2,3}$ is also connected between line $11_2$ and $26_3$. A pair of normally closed contacts $30_3$ operated by the relay $14_3$ and a pair of normally closed contacts $13_3$ operated by the same relay are inserted in lines $11_1$ and $11_2$ respectively. Normally open contacts $15_3$ also operated by relay $14_3$ can establish signal connection between terminal $1_3$ and common terminal 2. A pair of normally closed contacts $26_1$ operated by relay $14_1$ are inserted in series with contacts $25_2$ (operated by relay $14_2$) and with winding $12_3$. Thus if any one of the terminals $1_1$, $1_2$, or $1_3$ operates independently, then it will be connected to the common terminal 2 while shutting out the other two terminals. If two or more operate simultaneously the terminals will take priority in the order $1_1$, $1_2$, $1_3$.

From this can be seen that an N-terminal circuit may be provided by having one relay 14 for each terminal, one resistor 21 for each relay except that of highest priority, one pair of normally closed contacts of each relay of lower priority in each line 11, a normally closed contact of each relay of higher priority and those of lower priority.

It should be noted that in this disclosure simultaneous operation is intended to indicate requests which occur in a time interval less than that required to operate the armature of the relay of the terminal 1 concerned.

I claim:

1. A circuit for connecting one of a first and second terminals to a common terminal, wherein said first and second terminals develop a reference potential when requesting connection to said common terminal, which comprises, a relay for each said first and second terminals, a first pair of contacts operated by each respective relay for connecting the respective terminals to said common terminal, a current source for energizing each said relay upon establishment of said reference potential by its respective terminal, and priority establishing means for one of said first and second terminals comprising, reference potential shunting means for inhibiting current supply by said current source to the relay of the terminal of lower priority when said terminal of higher priority is developing its reference potential.

2. A circuit as defined in claim 1 wherein said current supply means for said relay of said terminal of lower priority includes a resistance connecting said last mentioned relay to said current source, and means connecting said resistance to said terminal of higher priority for bleeding current through said resistance when the terminal of higher priority develops its reference potential, energization of said relay of said terminal of lower priority being thereby prevented.

3. A circuit as defined in claim 2 wherein said means connecting said resanistce to said higher priority terminal includes a diode.

4. A circuit as defined in claim 3 comprising a second pair of contacts operated by said relay of lower priority, said contacts breaking connection between the relay of higher priority and its terminal for preventing operation of said relay of higher priority when said relay of lower priority is in its operated state.

5. A circuit as defined in claim 2 comprising a third said terminal, the order of priority being in the sequence first, second, third, the current supply means for the relays of said second and third terminals each including a resistance, and means connecting both said resistance of said second terminal and said resistance of said third terminal to said first terminal for bleeding current through said resistances and preventing operation of said relays of said second and third terminals when said first terminal develops its reference potential.

6. A circuit as defined in claim 3 comprising a third pair of contacts operated by said relay of higher priority for breaking said current supply means for said relay of said terminal of lower priority when said relay of the terminal of higher priority is in operated state.

References Cited

UNITED STATES PATENTS

| | | | |
|---|---|---|---|
| 2,682,814 | 7/1954 | Higonnet et al. | 317—140 |
| 3,010,053 | 11/1961 | Schubert | 317—155.5 |

JOHN W. CALDWELL, *Primary Examiner.*

NEIL C. READ, *Examiner.*

D. YUSKO, *Assistant Examiner.*